United States Patent

Protz, Jr.

[11] Patent Number: 5,553,823
[45] Date of Patent: Sep. 10, 1996

[54] WREATH HANGER

[75] Inventor: William F. Protz, Jr., Lake Forest, Ill.

[73] Assignee: Santa's Best, Northfield, Ill.

[21] Appl. No.: 386,078

[22] Filed: Feb. 9, 1995

[51] Int. Cl.⁶ .................................................. F16B 45/00
[52] U.S. Cl. ............................ 248/304; 248/215; 248/339
[58] Field of Search ..................................... 248/304, 305,
248/215, 222.21, 227.1, 227.2, 339, 340,
692, 307, 208

[56] References Cited

U.S. PATENT DOCUMENTS

| | | | |
|---|---|---|---|
| 4,372,450 | 2/1983 | Licari et al. | 248/304 X |
| 4,417,712 | 11/1983 | DeHart | 248/304 X |
| 4,973,021 | 11/1990 | Schuite | 248/215 X |
| 5,368,267 | 11/1994 | Howard | 248/208 X |
| 5,413,297 | 5/1995 | Adams | 248/304 X |

*Primary Examiner*—Ramon O. Ramirez
*Attorney, Agent, or Firm*—Emrich & Dithmar

[57] ABSTRACT

An extendible hanger assembly with a mounting member for mounting the extendible hanger onto a door. A hook for holding a decorative object such as a wreath or garland and one or more or no extension members connectable to each other and to the mounting member and to the hook to provide a variously extendible hanger assembly removably mountable on a door for holding a decorative object such as a wreath or garland.

12 Claims, 2 Drawing Sheets

5,553,823

WREATH HANGER

BACKGROUND OF THE INVENTION

This is a invention which pertains to a wreath hanger assembly for displaying wreathes and other decorative items such as garlands, Christmas tree ornaments and the like on the door at Christmas time. A variety of mechanisms have been sold and patented relating to hanging items on flat surfaces. A great many of such items include suction cups or adhesive pads in order securely to fasten a hook to a flat surface such as a wall, door or window. Generally, small hooks may adequately be adhered to surfaces by the use of suction cups or small adhesive pads but when larger items such as a wreaths are used the amount involved precludes the use of small suction cups particularly on a surface such as a door which is being opened and closed continuously and may dislodge the device or otherwise cause a suction cup to fail.

SUMMARY OF THE INVENTION

Accordingly, there is disclosed a hanger for use on a door which is inexpensive to make, can be extended to any desired distance to position a wreath or other decorative item at a convenient height respective of the height of the door.

Another object of the invention is to provide a door hanger of the type set forth in which the device for mounting the hanger to the door is operative irrespective of the weight of the decorations hung thereon.

Yet another object of the invention is to provide a door hanger which is easy to construct yet reliable.

Another object of the invention is to provide a door hanger of the type set forth which is inexpensive yet satisfies all the objects of the invention.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
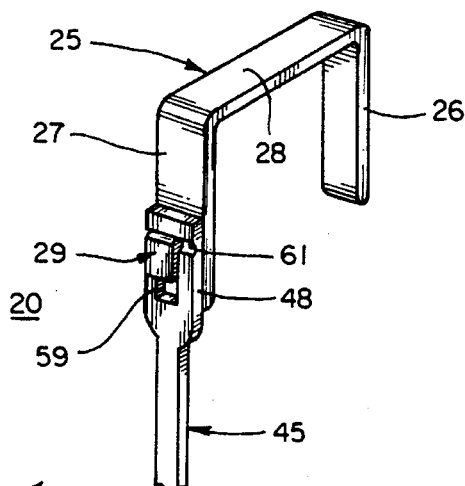
FIG. 1 is a perspective view of the extendable hanger assembly of the present invention.
Figure 2:
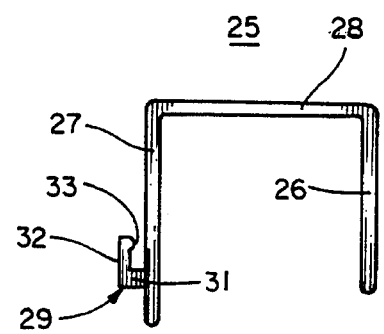
FIG. 2 is side elevational view of the mounting member for the assembly illustrated in FIG. 1.
Figure 3:
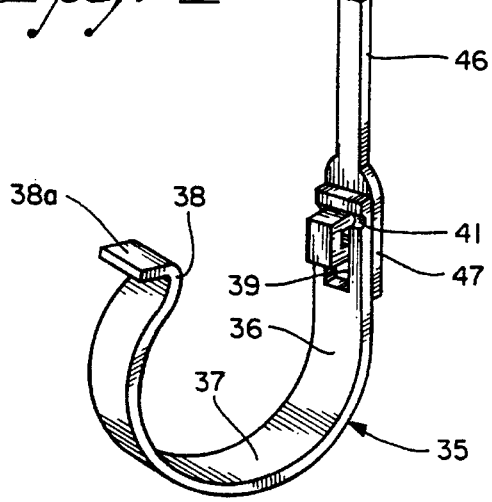
FIG. 3 is a front view of the mounting member illustrated in FIG. 2.
Figure 3:
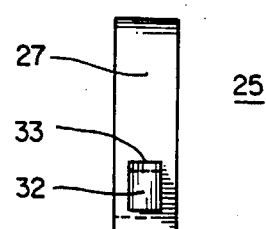
Figure 4:
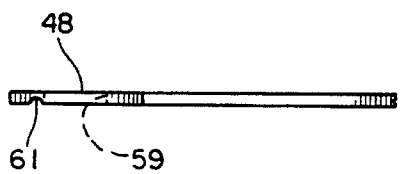
FIG. 4 is a side elevational view of an extension member for the hanger illustrated in FIG. 1.
Figure 5:
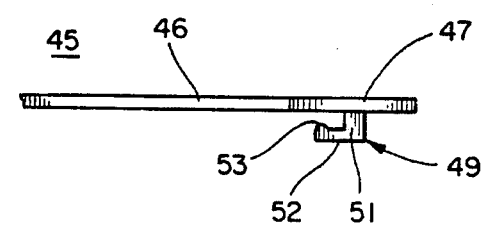
FIG. 5 is a front view of the hanger assembly illustrated in FIG. 4.
Figure 5:
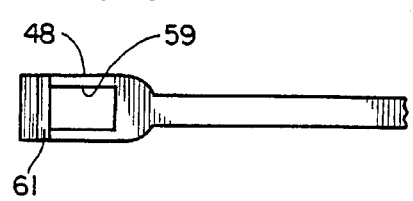
Figure 6:
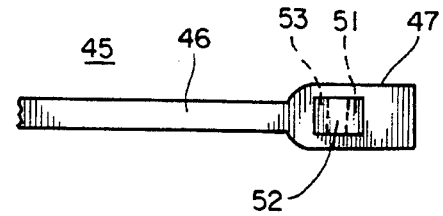
FIG. 6 is a right end elevational view of the hanger illustrated in FIG. 5.
Figure 6:
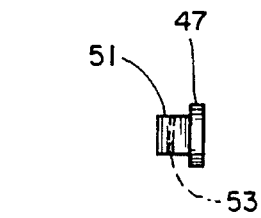
Figure 7:
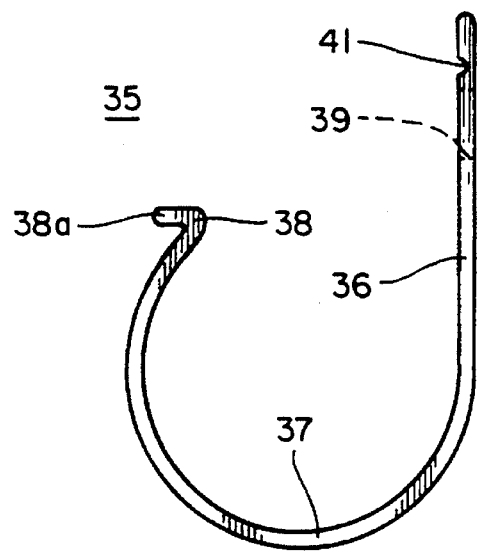
FIG. 7 is an enlarged side elevational view of the hook member illustrated in FIG. 1.
Figure 8:
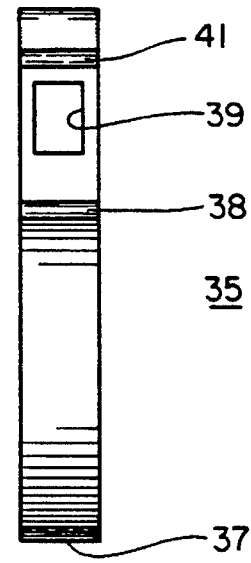
FIG. 8 is a front view of the hook illustrated in FIG. 7.
Figure 9:
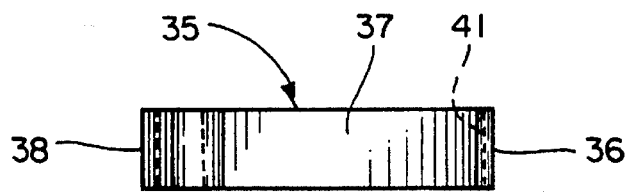
FIG. 9 is a bottom view of the hook illustrated in FIG. 7.

Referring now to the drawings, there is disclosed a hanger assembly 20 comprised of a mounting member 25, a hook member 35 and one or more extension members 45 intermediate the mounting member 25 and the hook member 35. The mounting member 25 is generally U-shaped and includes spaced apart legs 26 and 27 interconnected by a bight 28. The bight 28 should be of sufficiently thin so as when mounted on a door, the door will be able to be opened and closed without undo friction or destruction of the mounting member 25. A connection device 29 extends forwardly of the leg 27 and is generally L-shaped including a horizonal leg 31 integral with a vertical leg 32. An inwardly extending nib 33 transverses the width of the vertical leg 32, for a purpose to be described.

The hook member 35 includes a vertical leg portion 36 integral with a curved portion 37 which extends all the way to a reverse curve portion 38 terminating in a horizonal portion 38a. The vertical leg 36 includes an aperture 39 above which is a horizonal groove 41 in the leg 36.

Each extension member 45 and there may be several in the commercial package, includes a strap portion 46 having an end portion 47 and an opposite end portion 48. The end portion 47 is provided with a connection device 49 which is similar to a connection device 29 in that it includes a horizontal leg 51, an integral vertical leg 52 and an inwardly facing nib 53. The end portion 48 includes an aperture 59 generally of the same dimension as the aperture 39 in the hook 35. An associated groove 61 similar to the groove 41 in the hook member 35 is in the end 48.

In operation, the hanger assembly 20 is mounted onto the door by positioning the mounting member 25 over the top of the door with the connection device 29 facing outwardly. The first extension member is then snapped onto the connection device 21 and more particularly the end 48 of the strap 46 is positioned over the connection device 29 and snapped into place such that the nib 33 fits into the groove 61 thereby to lock the first extension member 45 into place on the mounting member 25. One or more or no extension members may be used as necessary since each extension member has a both a connection device 49 and an aperture 59 at opposite ends thereof. Finally, the hook member 35 is snapped fitted onto the connection device 49 on the last extension member 45 such that the groove 41 of the hook member 35 receives the nib 53 on the associated extension member 45.

A variety of materials may be used for the hanger assembly 20; however, synthetic organic resins which are inexpensive are preferred. Moreover, various synthetic organic resins such as an acrylic, polyethylene, polypropylene or mixtures there of along with PVC and other common synthetic organic resins which provide some flexibility are preferred. Because the synthetic organic resins have some flexibility or "give", the nibs of the connection devices such as nib 33 and nib 53 are positioned somewhat closer to the adjacent strap wall such as 27 and 46 respectively than the width of the end 48 of the associated extension member 45. This causes a little tension between the connection device 29 or 49 and the associated groove which secures the connection between the various members of the hanger assembly 20. It may be that a clear plastic is preferred and such is easily accommodated with a variety of synthetic organic resins.

While there has been disclosed what is considered to be the preferred embodiment of the present invention, it is understood that various changes in the details may be made without departing from the spirit, or sacrificing any of the advantages of the present invention.

I claim:

1. An extendible hanger assembly, comprising:
a U-shaped mounting member having two legs interconnected by a thin bight to fit over the top of a door for mounting said extendible hanger to a door; a hook member for holding a decorative object such as a wreath or garland; and one or more extension members connectable to each other and to said mounting member and to said hook member to provide an extendible hanger assembly removably mountable on a door for holding a decorative object such as a wreath or garland, one of said legs carrying a device thereon for removable connection to one of said extension members.

2. The hanger assembly of claim 1, wherein said extension members are elongated straps having a connecting device at one end and an aperture at the other end.

3. The hanger assembly of claim 1, wherein said hanger assembly is a clear synthetic organic resin.

4. The hanger assembly of claim 3, wherein said device on one of said legs is L-shaped to fit into an aperture in one of said extension members.

5. The hanger assembly of claim 1, wherein each of said extension members has an aperture at one end and a removable connection device at the other end.

6. The hanger assembly of claim 5, wherein an aperture in each of said extension members has a locking groove associated herewith and each removable connection device on said extension members has a nib which snap fits into the associated groove when said extension members are connected one to the other.

7. The hanger assembly of claim 5, wherein said mounting member and said hook member have either a locking groove associated with an aperture or a nib associated with a removable connection device to cooperate with one or more of said extension members.

8. The hanger assembly of claim 5, wherein said mounting member has a removable connection device with a nib and said hook member has an aperture with an associated locking groove.

9. An extendible hanger assembly, comprising: a mounting member having a removable connection device thereon; a hook member for holding a decorative object such as a garland or wreath and having an aperture at one end thereof; one or more extension members connectable to each other and to said removable connection device on said mounting member and to said hook member; and said extension members each having a connection device at one end and an aperture to receive a connection device at the other end, each aperture in said hook member and said extension member having a groove associated therewith.

10. The extension hanger of claim 9, wherein said connection device is an L-shaped member.

11. The extension hanger of claim 9, wherein each of said L-shaped connection devices has a nib which snap fits into a groove associated with an aperture to form a locking connection.

12. An extendible hanger assembly, comprising: a mounting member for mounting said extendible hanger to a door; a hook member for holding a decorative object such as a wreath or garland; and at least one mounting member and said hook member having a connection device thereon and the other having an aperture therein for removably receiving said connection device, said connection device having a nib associated therewith and said aperture has a groove associated therewith, said nib snap fitting into said groove to lock said mounting member to said hook member.

* * * * *